US012676671B2

(12) United States Patent
Nakamura et al.

(10) Patent No.: US 12,676,671 B2
(45) Date of Patent: Jul. 7, 2026

(54) OPTICAL TRANSMISSION SYSTEM, SIGNAL QUALITY MEASUREMENT APPARATUS AND SIGNAL QUALITY MEASUREMENT METHOD

(71) Applicant: NTT, Inc., Tokyo (JP)

(72) Inventors: Masanori Nakamura, Musashino (JP);
Hiroshi Yamazaki, Musashino (JP);
Takayuki Kobayashi, Musashino (JP);
Fukutaro Hamaoka, Musashino (JP);
Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 339 days.

(21) Appl. No.: 18/682,967

(22) PCT Filed: Sep. 7, 2021

(86) PCT No.: PCT/JP2021/032815
§ 371 (c)(1),
(2) Date: Feb. 12, 2024

(87) PCT Pub. No.: WO2023/037403
PCT Pub. Date: Mar. 16, 2023

(65) Prior Publication Data
US 2025/0233659 A1 Jul. 17, 2025

(51) Int. Cl.
*H04B 10/079* (2013.01)
(52) U.S. Cl.
CPC . *H04B 10/07953* (2013.01); *H04B 10/07957* (2013.01); *H04B 10/0797* (2013.01)
(58) Field of Classification Search
CPC ........ H04B 10/07953; H04B 10/07957; H04B 10/0797

(Continued)

(56) References Cited

U.S. PATENT DOCUMENTS 9,363,032 B2 * 6/2016 Renaudier ............. H04L 1/0035
10,484,230 B2 * 11/2019 Liu ..................... H04L 27/0014

(Continued)

OTHER PUBLICATIONS

Seiji Okamoto et al., "Digital In-band OSNR Estimation for Polarization-Multiplexed Optical Transmission", Proc. of 2013 18th OptoElectronics and Communications Conference held jointly with 2013 International Conference on Photonics in Switching, TuR2-4, 2013.

*Primary Examiner* — Dalzid E Singh
(74) *Attorney, Agent, or Firm* — Harness, Dickey & Pierce, P.L.C.

(57) ABSTRACT
A transmission apparatus repeatedly inserts reference signal sequences into a transmission signal sequence at different timings, and converts the transmission signal sequence, into which the reference signal sequences are inserted, into an optical signal. The reception apparatus includes a detection unit, a waveform equalization unit, and a signal quality measurement unit. The detection unit receives the optical signal transmitted through an optical transmission line, and converts the received optical signal into a reception signal of an electrical signal. The waveform equalization unit performs waveform equalization on the reception signal converted into the electrical signal. The signal quality calculation unit extracts a reception signal sequence set in each section corresponding to the reference signal sequence from the received signal on which waveform equalization performed. For each combination of different sections, the signal quality calculation unit calculates a mean square error between the mean of the reception signal sequences set in the sections included in a combination and the reference signal sequence, and calculates a signal-to-noise ratio and a signal-to-distortion ratio of the reception signal using the mean square error calculated for each combination.

5 Claims, 3 Drawing Sheets

(58) Field of Classification Search
USPC ........................................................ 398/204
See application file for complete search history.

(56)                      References Cited

U.S. PATENT DOCUMENTS

2015/0341138 A1* 11/2015 Ishihara .................... H04J 3/14
                                              398/35
2016/0013863 A1*  1/2016 Dou ................... H04B 10/5561
                                              398/32
2018/0069625 A1*  3/2018 Arikawa ............. H04B 10/077
2020/0028586 A1*  1/2020 Okamoto ............... H04J 14/06

* cited by examiner

OPTICAL TRANSMISSION SYSTEM, SIGNAL QUALITY MEASUREMENT APPARATUS AND SIGNAL QUALITY MEASUREMENT METHOD

CROSS-REFERENCE TO RELATED APPLICATIONS

This application is a 371 U.S. National Phase of International Application No. PCT/JP2021/032815, filed on Sep. 7, 2021. The entire disclosure of the above application is incorporated herein by reference.

TECHNICAL FIELD

The present invention relates to an optical transmission system, a signal quality measurement apparatus, and a signal quality measurement method.

BACKGROUND ART

In order to operate an optical transceiver with an optimum setting in optical transmission with a large capacity, it is required to monitor signal quality in detail (Non Patent Literature 1). In recent years, it has been also required to monitor the influence of nonlinearity of an optical device or an electrical device used in a transceiver.

CITATION LIST

Non Patent Literature

Non Patent Literature 1: S. Okamoto, et al., "Digital In-band OSNR Estimation for Polarization-Multiplexed Optical Transmission," Proc. of 2013 18th OptoElectronics and Communications Conference held jointly with 2013 International Conference on Photonics in Switching, TuR2-4, 2013.

SUMMARY OF INVENTION

Technical Problem

Conventionally, as an index of signal quality, a bit error rate, waveform matching between a reference signal and a reception signal, and the like have been measured. In these signal quality measurements, it is not possible to distinguish between random noise such as spontaneous emission light of an optical amplifier and thermal noise in an electronic device and contribution due to deterministic distortion depending on a transmission waveform such as a transfer function and nonlinearity in a communication path. When it is separated whether the deterioration factor of the conventionally used signal quality index such as waveform consistency is random noise or deterministic distortion, it is possible to take appropriate measures for improving the signal quality. For example, in a case where the influence of random noise on the signal quality is large, it is possible to take measures such as setting for improving the signal power. On the other hand, in a case where deterministic distortion is dominant, a distortion compensation technique by digital signal processing is applied, and in a case of non-linear distortion depending on signal power, signal quality can be improved by reducing the signal power.

In view of the above circumstances, an object of the present invention is to provide an optical transmission system, a signal quality measurement apparatus and a signal quality measurement method for measuring quality so that whether deterioration in signal quality is caused by random noise or deterministic distortion can be distinguished.

Solution to Problem

An aspect of the present invention is an optical transmission system including a transmission apparatus and a reception apparatus, in which a transmission apparatus includes an insertion unit (hereinafter also referred to as "inserter") that repeatedly inserts reference signal sequences into a transmission signal sequence at different timings, and a modulation (hereinafter also referred to as "modulator") unit that converts the transmission signal sequence, into which the reference signal sequences have been inserted, into an optical signal, the reception apparatus includes a detection unit (hereinafter also referred to as "detector") that receives the optical signal which has transmitted through an optical transmission line, and converts the received optical signal into a reception signal of an electrical signal, a waveform equalization unit (hereinafter also referred to as "waveform equalizer") that performs waveform equalization on the reception signal which has been converted into the electrical signal, and a signal quality calculation unit (hereinafter also referred to as "signal quality calculator") that extracts reception signal sequences set in sections, each of the sections corresponding to each of the reference signal sequences, from the reception signal on which waveform equalization has been performed, calculates, for each of a plurality of combinations which include the different sections and in which the numbers of the included sections are different at least in part, a mean square error between a mean of the reception signal sequences set in the sections included in each of the combinations and the reference signal sequences, and calculates a signal-to-noise ratio and a signal-to-distortion ratio of the optical signal using the mean square error calculated for each of the combinations.

A signal quality measurement apparatus of an aspect of the present invention includes a signal quality calculation unit that extracts reception signal sequences set in sections, each of the sections corresponding to each of reference signal sequences which have been repeatedly set in a signal by a transmission apparatus at different timings, from the signal obtained by converting an optical signal which has transmitted through an optical transmission line into an electrical signal, calculates, for each of the plurality of combinations which include the different sections and in which the numbers of the included sections are different at least in part, a mean square error between a mean of the reception signal sequences set in the sections included in each of the combinations and the reference signal sequences, and calculates a signal-to-noise ratio and a signal-to-distortion ratio of the optical signal using the mean square error calculated for each of the combinations.

An optical transmission method of an aspect of the present invention includes causing a transmission apparatus to include an insertion step of repeatedly inserting reference signal sequences into a transmission signal sequence at different timings, and a first modulation step of converting the transmission signal sequence, into which the reference signal sequences have been inserted, into an optical signal, a reception apparatus to include a second modulation step of receiving the optical signal which has transmitted through an optical transmission line, and converting the received optical signal into a reception signal of an electrical signal, a waveform equalization step of performing waveform equalization on the reception signal which has been converted into the electrical signal, an extraction step of extracting reception signal sequences set in sections, each of the sections corresponding to each of the reference signal sequences, from the reception signal on which waveform equalization has been performed, and a signal quality calculation step of calculating, for each of a plurality of combinations which include the different sections and in which the numbers of the included sections are different at least in part, a mean square error between a mean of the reception signal sequences set in the sections included in each of the combinations and the reference signal sequence, and calculating a signal-to-noise ratio and a signal-to-distortion ratio of the optical signal using the mean square error calculated for each of the combinations.

A signal quality measurement method of an aspect of the present invention includes an extraction step of extraction step of extracting reception signal sequences set in sections, each of the sections corresponding to each of reference signal sequences which have been repeatedly set in a signal by a transmission apparatus at different timings, from the signal obtained by converting an optical signal which has transmitted through an optical transmission line into an electrical signal, and a signal quality calculation step of calculating, for each of the plurality of combinations which include the different sections and in which the numbers of the included sections are different at least in part, a mean square error between a mean of the reception signal sequences set in the sections included in each of the combinations and the reference signal sequence, and calculating a signal-to-noise ratio and a signal-to-distortion ratio of the optical signal using the mean square error calculated for each of the combinations.

Advantageous Effects of Invention

According to the present invention, it is possible to measure the quality so that whether deterioration in signal quality is caused by random noise or deterministic distortion can be distinguished.

DESCRIPTION OF EMBODIMENTS

In the description below, embodiments of the present invention will be explained in detail, with reference to the drawings.

First Embodiment

Figure 1:
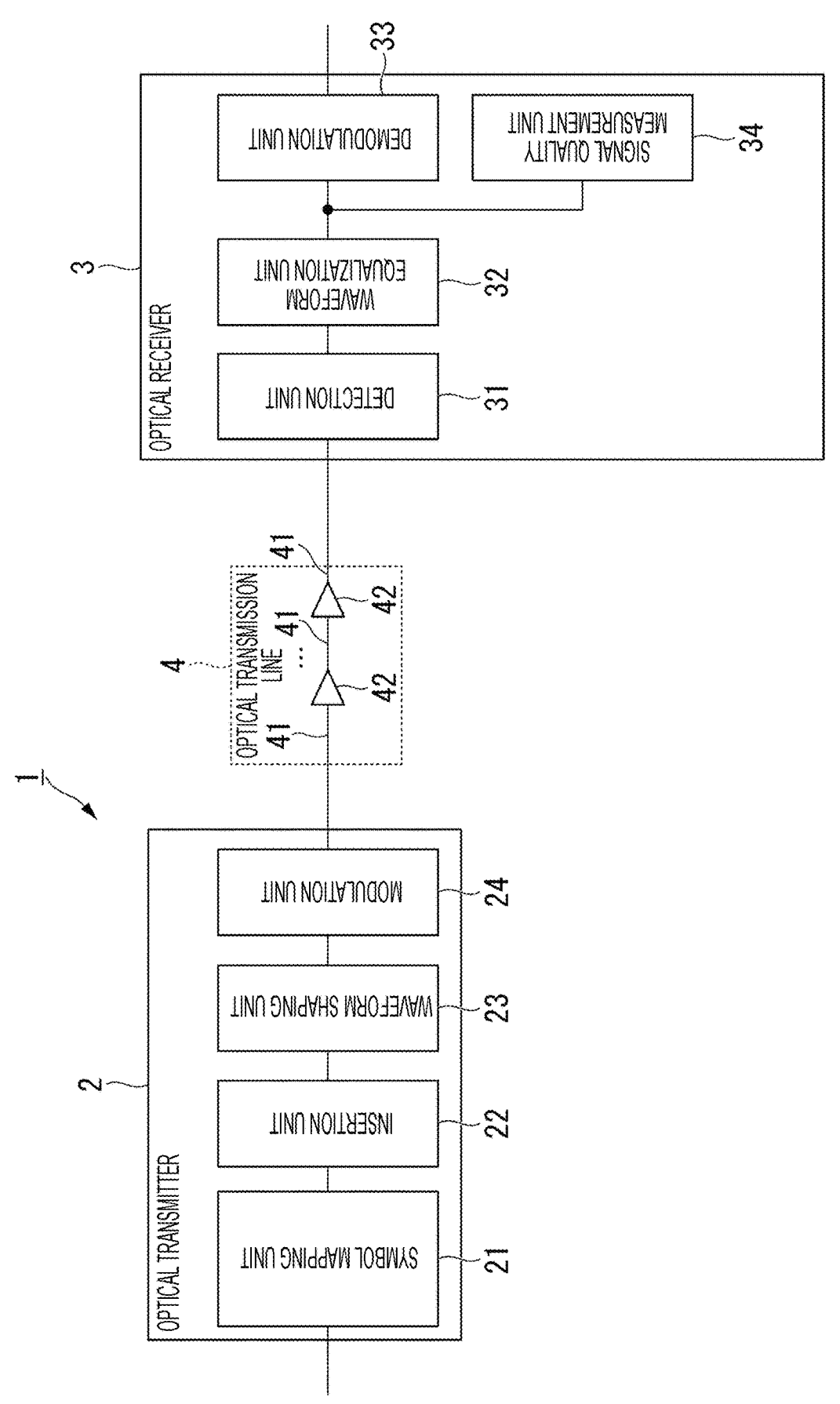
FIG. 1 is a diagram illustrating a configuration of an optical transmission system according to an embodiment of the present invention.

FIG. 1 is a diagram illustrating a configuration of an optical transmission system 1 according to a first embodiment. The optical transmission system 1 includes an optical transmitter 2 and an optical receiver 3. The optical transmitter 2 and the optical receiver 3 are connected by an optical transmission line 4.

The optical transmitter 2 includes a symbol mapping unit 21, an insertion unit 22, a waveform shaping unit 23, and a modulation unit 24.

The symbol mapping unit 21 encodes a transmission bit sequence to generate a transmission signal and maps the generated transmission signal to a symbol. The insertion unit 22 repeatedly inserts the reference signal sequence into the transmission signal sequence mapped to the symbol by the symbol mapping unit 21 at different timings.

Figure 2:
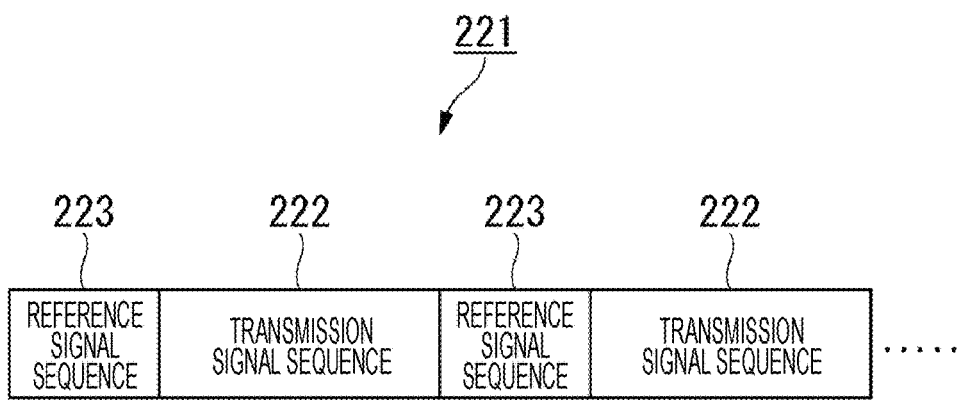
FIG. 2 is a diagram illustrating a transmission signal sequence in the optical transmission system according to the embodiment.

FIG. 2 is a diagram illustrating a signal sequence 221 of the transmission signal output from the insertion unit 22. The signal sequence 221 includes a transmission signal sequence 222 mapped by the symbol mapping unit 21 and reference signal sequences 223 inserted by the insertion unit 22. The insertion unit 22 may generate the signal sequence 221 to provide a cyclic prefix or a guard interval between the transmission signal sequence 222 and the reference signal sequence 223. By providing the cyclic prefix and the guard interval, it is possible to prevent distortion depending on the transmission signal sequence 222 from leaking into the reference signal sequences 223. Therefore, it is possible to improve detection accuracy of deterministic distortion and random noise components detected based on the reference signal sequences 223. In addition, in a case where transmission of information is unnecessary at the time of shipment inspection, initial calibration, or the like, all the signal sequences 221 may be the reference signal sequences 223. In this case, since the length of the reference signal sequence 223 can be increased, the randomness of the reference signal sequence 223 and the completeness of the sequence appearing in the reference signal sequence 223 are improved. Therefore, deterministic distortion can be detected more accurately.

The waveform shaping unit 23 illustrated in FIG. 1 performs sampling ratio conversion on the transmission signal output from the insertion unit 22 and shapes the waveform (spectrum) of the transmission signal. The waveform shaping unit 23 outputs the transmission signal obtained by shaping the waveform to the modulation unit 24. In a case where the modulation unit 24 converts a digital signal into an analog signal at intervals of a symbol period, the resampling processing in the waveform shaping unit 23 can be omitted. Furthermore, the waveform shaping unit 23 may perform pre-equalization processing of providing inverse characteristics of linear and nonlinear distortions of the waveform of the transmission signal generated in the modulation unit 24 or the optical transmission line 4.

The modulation unit 24 converts the transmission signal output from the waveform shaping unit 23 from a digital signal to an analog signal by a digital-to-analog converter (DAC) (not illustrated). The DAC outputs the converted analog signal to an optical front end unit (not illustrated). The optical front end unit converts an analog signal output from the DAC from an electrical signal into an optical signal. For example, the optical front end unit amplifies the transmission signal output from the DAC by using a driver amplifier (not shown) and drives an optical modulator (not shown) by using the amplified transmission signal. The optical modulator modulates light output from a laser light source (not illustrated) with a transmission signal to convert a transmission signal of an analog signal into an optical signal, and generates an optical signal. The optical front end unit outputs the generated optical signal to the optical transmission line 4.

The optical receiver 3 includes a detection unit 31, a waveform equalization unit 32, a demodulation unit 33, and a signal quality measurement unit 34. The optical receiver 3 is an example of a signal quality measurement apparatus.

The detection unit 31 receives the optical signal transmitted through the optical transmission line 4, and converts the received optical signal into a reception signal of an electrical signal. The detection unit 31 converts an optical signal into a reception signal of an electrical signal by a photodetector (not illustrated). Specifically, the photodetector causes a received optical signal to interfere with light output from a local laser light source (not illustrated), and then converts the optical signal into a reception signal of an electrical signal by a photodiode (not illustrated) or the like. A linear amplifier (not illustrated) such as a transimpedance amplifier amplifies a reception signal of the electrical signal converted by the photodetector and outputs the amplified signal to an analog-to-digital converter (ADC) (not illustrated). The ADC converts the input reception signal from an analog signal to a digital signal, and outputs the converted digital signal to the waveform equalization unit 32.

The waveform equalization unit 32 receives the reception signal of the digital signal from the detection unit 31 and outputs the reception symbol sequence on which waveform equalization is performed. The waveform equalization unit 32 performs, on the reception signal, compensation for frequency characteristics in the optical front end unit and compensation for wavelength dispersion and polarization mode dispersion received in the optical transmission line 4 by waveform equalization. In a case where the optical receiver 3 is a digital coherent optical transceiver, the waveform equalization unit 32 compensates for a shift (frequency offset) in carrier wave frequencies of a laser light source (not illustrated) in the optical transmitter 2 and a local laser light source (not illustrated) in the optical receiver 3 and laser phase noise.

The demodulation unit 33 receives the received symbol sequence from the waveform equalization unit 32. The demodulation unit 33 performs demapping processing on the input received symbol sequence. The demodulation unit 33 determines bits from the symbols by the demapping processing to obtain a received bit sequence subjected to forward error correction coding. Further, the demodulation unit 33 decodes the received bit sequence subjected to forward error correction coding, and performs error correction to obtain a received bit sequence.

The signal quality measurement unit 34 receives the reception signal sequence from the waveform equalization unit 32. The signal quality measurement unit 34 calculates a signal-to-noise distortion ratio (SINAD; Signal to noise and distortion ratio), a signal-to-noise ratio (SNR; Signal to noise ratio), and a signal-to-distortion ratio (SDR; Signal to distortion ratio) as monitor values of the signal quality based on the reception signal sequence and outputs the monitor values.

The optical transmission line 4 transmits the optical signal output from the optical transmitter 2 to the optical receiver 3. The optical transmission line 4 includes an optical fiber 41 and an optical amplifier 42. The optical fiber 41 connects the optical transmitter 2 or the optical amplifier 42 in the preceding stage to the optical amplifier 42 in the subsequent stage or the optical receiver 3. The optical amplifier 42 amplifies the optical signal transmitted through the optical fiber 41 on the input side and inputs the amplified optical signal to the optical fiber 41 on the output side. The number of optical amplifiers 42 is arbitrary.

Figure 3:
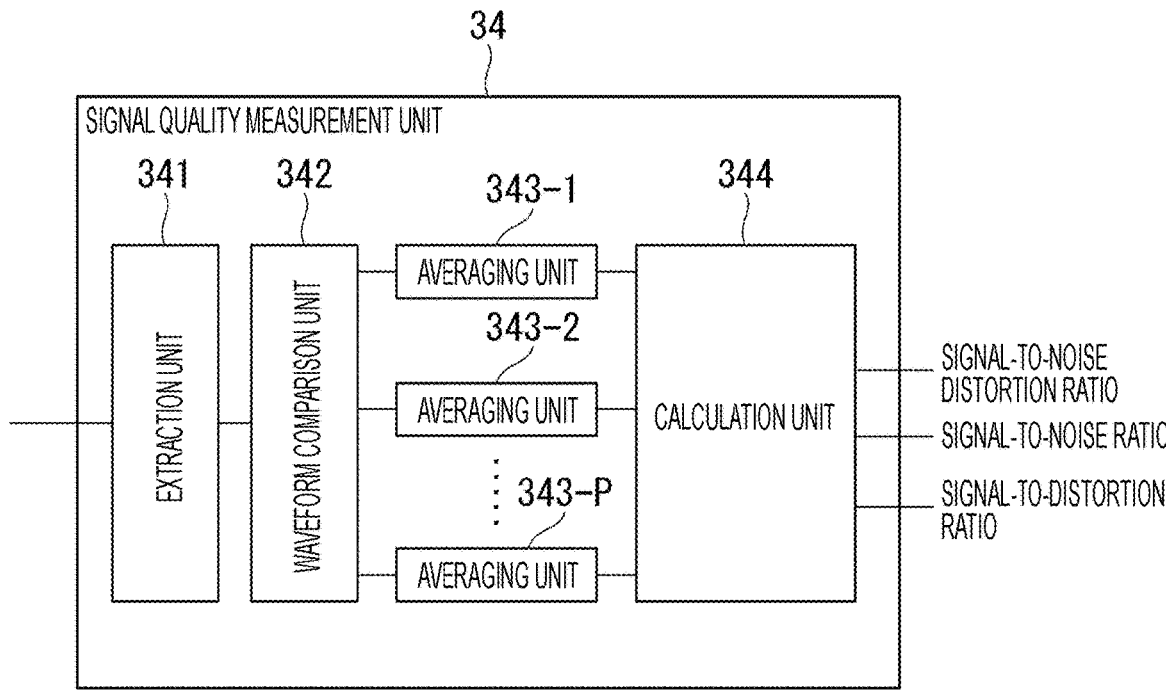
FIG. 3 is a diagram illustrating a configuration of a signal quality measurement unit according to the embodiment.

FIG. 3 is a diagram illustrating a detailed configuration of the signal quality measurement unit 34 included in the optical receiver 3. The signal quality measurement unit 34 includes an extraction unit (hereinafter also referred to as "extractor") 341, a waveform comparison unit (hereinafter also referred to as "waveform comparator") 342, P averaging units (hereinafter also referred to as "average calculators") 343, and a calculation unit (hereinafter also referred to as "calculator") 344. The P averaging units 343 are referred to as averaging units 343-1 to 343-P. P is a natural number of 2 or more, and may be any number.

The extraction unit 341 extracts a section corresponding to the reference signal sequence 223 set by the optical transmitter 2 from the equalized reception signal sequence output by the waveform equalization unit 32. The extracted reception signal sequence is referred to as an extracted reception signal sequence. The extraction unit 341 outputs the extracted reception signal sequence to the waveform comparison unit 342.

The waveform comparison unit 342 calculates an error sequence that is a difference between the extracted reception signal sequence input from the extraction unit 341 and the reference signal sequence. The averaging unit 343-$p$ ($p$ is an integer of 1 or more and P or less) calculates an average of $M_p$ ($M_p$ is a natural number of 1 or more) error sequences and calculates a mean square error of the average error sequence. The mean square error is obtained by averaging the square errors of the extracted reception signal sequence and the reference signal sequence. The values of the number of error sequences $M_1$ to $M_P$ are all different or at least partially different. Hereinafter, a case of $M_p=p$ will be described as an example. The averaging unit 343-$p$ calculates a mean square error for the number of averaging times N (N is an integer of 1 or more), and obtains an average of the calculated mean square errors.

In addition, the combinations of the error sequences to be processed used by the averaging units 343-1 to 343-P to calculate the mean square error are different. Here, a case where the averaging unit 343-$p$ sets an error sequence obtained at a $n_p$-th time to an error sequence obtained at the $(n_p+M_p-1)$-th time as a processing target will be described as an example. As described above, in a case where $M_p=p$, the averaging unit 343-$p$ averages $p$ error sequences from the error sequence obtained at the $n_p$-th time to the error sequence obtained at the $(n_p+p-1)$-th time, and performs processing of calculating a mean square error of the averaged error sequence N times while changing the value of $n_p$. The averaging unit 343-$p$ calculates the average of the calculated N mean square errors. The range of values taken by each of $n_1$ to $n_P$ may be the same, or some or all of them may be different. Hereinafter, a case where all $n_1$ to $n_P$ take values of natural numbers from 1 to N will be described as an example. The averaging unit 343-$p$ outputs the averaged mean square error to the calculation unit 344.

Through the above processing, the averaging unit 343 averages the extracted received signal sequence and averages the square errors of the extracted reception signal sequence and the reference signal sequence after the averaging. In a case where $M_p=p$, the averaging unit 343-$p$ averages the extracted reception signal sequences received at different repetition timings $p$ times, and then calculates a mean square error from the reference signal sequence.

The calculation unit 344 receives the mean square error averaged from each of the averaging units 343-1 to 343-P. The calculation unit 344 calculates the signal-to-noise ratio and the signal-to-distortion ratio using the averaged mean square errors and the average signal power. For the calculation of the signal-to-noise ratio and the signal-to-distortion ratio, a relational expression between the mean square errors, the average signal power, the signal-to-noise ratio, and the signal-to-distortion ratio is used. The calculation unit 344 further calculates the signal-to-noise distortion ratio using the signal-to-noise ratio and the signal-to-distortion ratio.

Next, an example of processing of the signal quality measurement unit 34 will be described.

The extraction unit 341 receives the equalized reception signal sequence from the waveform equalization unit 32. The extraction unit 341 extracts a section corresponding to a reference signal sequence s represented by Equation (1) from the input reception signal sequence.

[Math. 1]

$$s = (s_1, s_2, \ldots , s_K)^T \tag{1}$$

Here, T represents transposition of a vector. K represents a length of the number of symbols or the number of samples of the reference signal sequence 223. K is a natural number of 1 or more. The reference signal sequence s corresponds to the reference signal sequences 223 set in the signal sequence 221 by the insertion unit 22 of the optical transmitter 2. An n-th (n is an integer of 1 or more) extracted reception signal sequence $r_n$ extracted by the extraction unit 341 is expressed by Equation (2).

[Math. 2]

$$r_n = (r_1^n, r_2^n, \ldots , r_K^n)^T \tag{2}$$

Next, the waveform comparison unit 342 inputs the extracted reception signal sequences $r_1$, $r_2$, . . . extracted by the extraction unit 341. The waveform comparison unit 342 obtains an error sequence $e_n$ by taking a difference between the reference signal sequence s stored in advance and the corresponding extracted reception signal sequence $r_n$. That is, the error sequence $e_n$ is an error sequence obtained for the n-th time by the waveform comparison unit 342. The error sequence $e_n$ is expressed by Equation (3). The reference signal sequence s may be stored in advance in the waveform comparison unit 342 or may be received from the optical transmitter 2 or another device.

[Math. 3]

$$e_n = s - r_n = (e_1^n, e_2^n, \ldots , e_K^n)^T \tag{3}$$

Next, specific processing of the averaging unit 343 will be described. First, specific processing of the averaging unit 343-1 will be described. The averaging unit 343-1 takes the root mean square of the error sequence $e_n$ obtained at the n-th time by the waveform comparison unit 342 for each case where n is a natural number of 1 or more and N or less, and averages the obtained N root mean squares. That is, the averaging unit 343-1 calculates and outputs a mean square error $\sigma_1^2$ of Equation (4).

8

[Math. 4]

$$\sigma_1^2 = \frac{1}{N} \sum_{n=1}^N \frac{e_n^H e_n}{K} \tag{4}$$

Here, H represents complex conjugate transposition of the vector.

Next, specific processing in the averaging unit 343-2 will be described. For each case where n is a natural number of 1 or more and N or less, the averaging unit 343-2 averages the error sequence $e_n$ obtained at the n-th time and the error sequence $e_{n+1}$ obtained at the (n+1)-th time, then takes a root mean square, and averages the obtained N root mean squares. That is, the averaging unit 343-2 outputs a mean square error $\sigma_2^2$ of Equation (5).

[Math. 5]

$$\sigma_2^2 = \frac{1}{N} \sum_{n=1}^N \frac{(e_{n+1}^H + e_n^H)(e_{n+1} + e_n)}{4K} \tag{5}$$

Next, specific processing in the averaging unit 343-P will be described. For each case where n is a natural number of 1 or more and N or less, the averaging unit 343-P averages the error sequence $e_n$ obtained at the n-th time to the error sequence $e_{n+P-1}$ obtained at the (n+P-1)-th time, then takes a root mean square, and averages the obtained N root mean squares. That is, the averaging unit 343-P outputs a mean square error $\sigma_P^2$ of Equation (6).

[Math. 6]

$$\sigma_P^2 = \frac{1}{N} \sum_{n=1}^N \frac{\sum_{m=0}^{P-1} e_{n+m}^H \sum_{m=0}^{P-1} e_{n+m}}{P^2 K} \tag{6}$$

The calculation unit 344 inputs a mean square error $\sigma_p^2$ from each of the averaging units 343-$p$ (p is an integer of 1 or more and P or less). The calculation unit 344 obtains the average signal power $P_s$ by Equation (7).

[Math. 7]

$$P_s = \frac{1}{N} \sum_{n=1}^N \frac{s^H s}{K} \tag{7}$$

In a case where the first to N-th reference signal sequences s are different, the n-th reference signal sequence s is used as s in Equation (7). In addition, the calculation unit 344 may receive information of the average signal power $P_s$ from the optical transmitter 2.

The signal-to-noise distortion ratio SINAD can be represented by Equation (8) below using the mean square error $\sigma_p^2$ calculated by the averaging unit 343-$p$, the average signal power $P_s$, the signal-to-distortion ratio SDR, and the signal-to-noise ratio SNR.

[Math. 8]

$$\frac{\sigma_p^2}{P_s} = \frac{1}{SINAD(p)} = \frac{1}{SDR} + \frac{1}{p} \frac{1}{SNR} \tag{8}$$

Here, the SINAD (p) represents the SINAD using the mean square error $\sigma_p^2$ calculated by the averaging unit 343-$p$.

When Equation (8) above is summarized for the averaging units 343-1 to 343-P, the matrix form of Equation (9) is obtained.

[Math. 9]

$$\frac{1}{P_s}\begin{pmatrix}\sigma_1^2 \\ \sigma_2^2 \\ \vdots \\ \sigma_P^2\end{pmatrix} = \begin{pmatrix}1 & 1 \\ 1 & \frac{1}{2} \\ \vdots & \vdots \\ 1 & \frac{1}{P}\end{pmatrix}\begin{pmatrix}\frac{1}{SDR} \\ \frac{1}{SNR}\end{pmatrix} \tag{9}$$

Based on the least squares solution of the linear equation of Equation (9), the calculation unit 344 calculates the SDR and the SNR as in Equation (10) below.

[Math. 10]

$$\begin{pmatrix}\frac{1}{SDR} \\ \frac{1}{SNR}\end{pmatrix} = \frac{1}{P_s}\left(\begin{pmatrix}1 & 1 \\ 1 & \frac{1}{2} \\ \vdots & \vdots \\ 1 & \frac{1}{P}\end{pmatrix}^T\begin{pmatrix}1 & 1 \\ 1 & \frac{1}{2} \\ \vdots & \vdots \\ 1 & \frac{1}{P}\end{pmatrix}\right)^{-1}\begin{pmatrix}1 & 1 \\ 1 & \frac{1}{2} \\ \vdots & \vdots \\ 1 & \frac{1}{P}\end{pmatrix}^T\begin{pmatrix}\sigma_1^2 \\ \sigma_2^2 \\ \vdots \\ \sigma_P^2\end{pmatrix} \tag{10}$$

Further, the calculation unit 344 calculates the SINAD using the calculated SDR and SNR.

Note that the calculation unit 344 may use a matrix A obtained in advance as in Equation (11) when calculating Equation (10).

[Math. 11]

$$A = \left(\begin{pmatrix}1 & 1 \\ 1 & \frac{1}{2} \\ \vdots & \vdots \\ 1 & \frac{1}{P}\end{pmatrix}^T\begin{pmatrix}1 & 1 \\ 1 & \frac{1}{2} \\ \vdots & \vdots \\ 1 & \frac{1}{P}\end{pmatrix}\right)^{-1}\begin{pmatrix}1 & 1 \\ 1 & \frac{1}{2} \\ \vdots & \vdots \\ 1 & \frac{1}{P}\end{pmatrix}^T \tag{11}$$

Using the matrix A calculated in advance as in Equation (12), the calculation unit 344 can simplify the processing.

[Math. 12]

$$\begin{pmatrix}\frac{1}{SDR} \\ \frac{1}{SNR}\end{pmatrix} = \frac{1}{P_s}A\begin{pmatrix}\sigma_1^2 \\ \sigma_2^2 \\ \vdots \\ \sigma_P^2\end{pmatrix} \tag{12}$$

Note that, in a case where the number of error sequences to be processed by the averaging unit 343-$p$ is $M_p$, $1/M_p$ is used instead of $1/p$ for the value of the p-th element in the second column in the first matrix on the right side of Equation (9). Similarly, $1/M_p$ is used for elements corresponding to $1/p$ of the matrix in Equations (10) and (11).

The matrix calculation of Equation (9) corresponds to the least squares method, where 1/SNR is the slope with respect to the reciprocal of the number of sequences, and 1/SDR is the intercept. For this reason, at least some of $M_1$ to $M_P$, which are the number of error signals to be processed by the averaging units 343-1 to 343-P, need to have different values.

In the above description, the $M_p$ ($M_p=p$ in the above description) processing targets of the averaging unit 343-$p$ are the $m_p$ consecutive error sequences from the $n_p$-th ($n_p=n$ in the above description) error sequence $e_{np}$ to the $n_p+M_p-1$-th error sequence $e_{np+mp-1}$, but the present invention is not limited thereto. For example, it is assumed that $M_1$ and $M_2=2$, and the processing target of the averaging unit 343-1 is the n-th error sequence $e_n$ and the n+1-th error sequence $e_{n+1}$. In this case, the processing target of the averaging unit 343-2 may be the n-th error sequence $e_n$ and the n+2-th error sequence $e_{n+2}$, or may be the n+1-th error sequence $e_{n+1}$ and the n+4-th error sequence $e_{n+4}$. However, at least one of the number of error sequences $M_3$ to $M_P$ is a value other than two.

Further, for example, it is assumed that $M_1$ and $M_2=2$, and $M_3=3$. In this case, the N processing targets of the averaging unit 343-1 may be the first and second error sequences, the second and third error sequences, ..., the N-th and (N+1)-th error sequences, the N processing targets of the averaging unit 343-2 may be the 1-st and 11-th error sequences, the 2-nd and 12-th error sequences, ..., the N-th and N+10-th error sequences, and the N processing targets of the averaging unit 343-3 may be the 1-st to 3-rd error sequences, the 2-nd to 4-th error sequences, ..., the N to (N+2)-th error sequences.

Next, an example of a SINAD optimization method using the SNR and the SDR output from the signal quality measurement unit 34 will be described. The optical transmission system 1 acquires the SNR and the SDR when the signal power Ps is changed, and obtains signal power Ps dependency of 1/SNR and 1/SDR. At this time, the value of the signal power Ps at which 1/SINAD is minimized is obtained as a value when a function obtained by differentiating 1/SINAD=(1/SDR)+(1/SNR) with the signal power Ps becomes 0. For example, it is assumed that the Ps dependency of 1/SNR calculated according to the present embodiment is expressed as 1/SNR=(a/Ps)+b (where a and b are positive real numbers), and the Ps dependency of 1/SDR is expressed as 1/SDR=cPs$^3$+d. In this case, the signal power Ps is obtained as (a/3c)$^{-4}$. In addition, the Ps dependency of 1/SNR and the Ps dependency of 1/SDR may be arbitrary polynomials. By setting the obtained optimal signal power information in the optical transmitter 2, the SINAD can be maximized.

Next, the experiment results regarding calculation of the signal-to-noise distortion ratio, the signal-to-noise ratio, and the signal-to-distortion ratio will be described.

Figure 4:
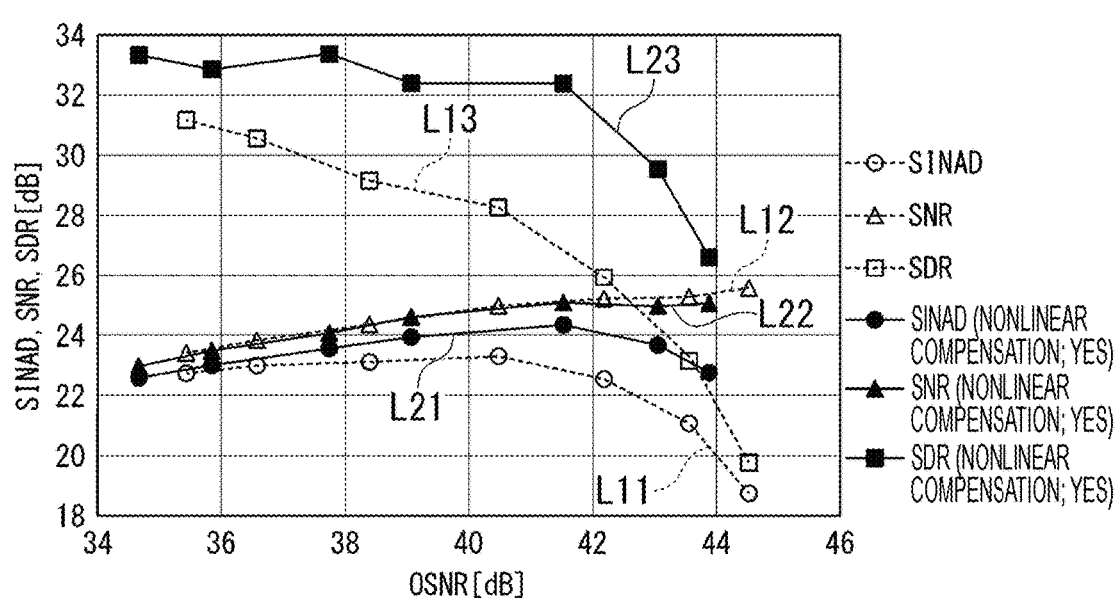
FIG. 4 is a diagram illustrating an experiment result using the optical transmission system according to the embodiment.

FIG. 4 is a diagram illustrating an experiment result using the optical transmission system 1 according to the present embodiment. FIG. 4 illustrates the dependence of the SINAD, the SNR, and the SDR on the optical signal-to-noise ratio (OSNR) when the input level to the driver amplifier is changed by changing the output level of the DAC. Note that the SINAD indicates a case of n=1 unless otherwise specified. Here, as the OSNR, a value measured by an optical spectrum analyzer is used. When the input to the driver amplifier is increased, the signal power becomes relatively large with respect to the spontaneous emission light of the optical amplifier, and the OSNR changes. This corresponds to the horizontal axis in FIG. 4. That is, the OSNR increases as the driver input power increases. On the other hand, the amount of distortion increases due to saturation characteristics of the driver amplifier. The SINAD (1) corresponding to the waveform consistency in the conventional method has an optimum point in the balance of the above effects. Using the method of the present embodiment, improvement of the OSNR can be obtained as a monotonous increase tendency of the SNR, and an increase in the distortion amount due to the saturation characteristic of the driver amplifier can be confirmed as a monotonous decrease tendency of the SDR. That is, it can be seen that SNR and SDR are correctly separated and measured.

A sequence of reference numerals L11 to L13 indicates a result in a case where non-linear compensation of the driver amplifier is not performed in the optical transmitter 2. Using the signal quality measurement unit 34 of the present embodiment to separate and measure the SINAD into the SNR and the SDR, it can be seen that the SDR is dominant in deterioration of the SINAD in a region where the OSNR is high (40 dB or more) as indicated by the series of reference numerals L11 to L13. Therefore, it can be seen that improvement of signal quality can be expected by compensating nonlinearity of the driver amplifier by preequalization.

A sequence of reference numerals L21 to L23 represents a result in a case where nonlinearity of the driver amplifier is compensated by the waveform shaping unit 23 of the optical transmitter 2. Using the signal quality measurement unit 34 of the present embodiment to similarly separate and measure the SINAD into the SNR and the SDR, it can be confirmed from the series of reference numerals L21 to L23 that the OSNR dependency of the SNR is not affected by the presence or absence of the non-linear compensation, but the saturation characteristics of the SDR are compensated and improved by the application of the non-linear compensation. Furthermore, it can be confirmed that the SINAD is similarly improved by application of non-linear compensation. From these, according to the present embodiment, if the SNR and the SDR can be separated, it is possible to improve signal quality by applying a method in accordance with a deterioration factor.

Figure 5:
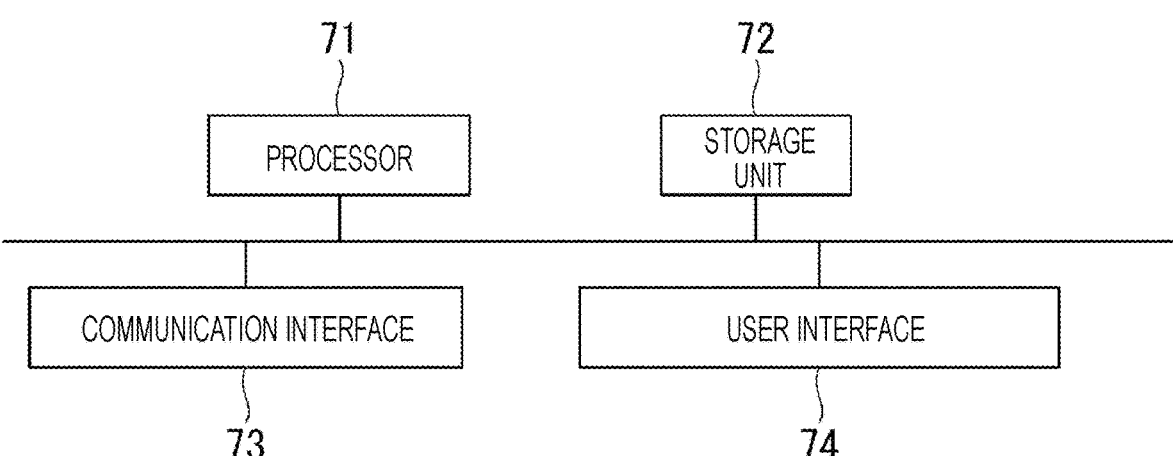
FIG. 5 is a diagram illustrating a hardware configuration of an optical receiver according to the embodiment.

Note that all or some of functions of the signal quality measurement unit 34 of the optical receiver 3 may be implemented by using hardware such as an application specific integrated circuit (ASIC), a programmable logic device (PLD), or a field programmable gate array (FPGA). Alternatively, all or some of the functions of the signal quality measurement unit 34 of the optical receiver 3 may be implemented by a processor such as a central processing unit (CPU) reading a program from a storage unit and executing the program. FIG. 5 illustrates a hardware configuration of the optical receiver 3 in this case.

FIG. 5 is a device configuration diagram illustrating a hardware configuration example of the optical receiver 3. The optical receiver 3 includes a processor 71, a storage unit 72, a communication interface 73, and a user interface 74.

The processor 71 is a central processing device that performs calculation and control. The processor 71 is a CPU, for example. The processor 71 implements the signal quality measurement unit 34 of the optical receiver 3 by reading and executing the program from the storage unit 72. All or some of the functions of the signal quality measurement unit 34 may be realized using hardware such as an ASIC, a PLD, or an FPGA. The storage unit 72 further includes a work area and the like to be used when the processor 71 executes various programs. The communication interface 73 is communicably connected to another device. The communication interface 73 corresponds to the detection unit 31, the waveform equalization unit 32, and the demodulation unit 33. The user interface 74 is an input device such as a keyboard, a pointing device (e.g. mouse), buttons, or a touchscreen or a display device such as a display. Artificial operations are input through the user interface 74.

Note that a signal quality device that is an external device connected to the optical receiver 3 may include the signal quality measurement unit 34. In this case, the optical receiver 3 may not include the signal quality measurement unit 34.

According to the embodiment described above, the optical transmitter 2 repeatedly transmits the same reference signal sequences, and the optical receiver 3 averages the error signals between the reference signal and the reception signals, thereby being able to separate and calculate the amount of signal quality degradation due to random noise and deterministic distortion. It is possible to reliably improve the signal quality by taking a measure suitable for the deterioration factor in the optical transmission system 1.

According to the above-described embodiment, the optical transmission system includes a transmission apparatus and a reception apparatus. For example, the transmission apparatus corresponds to the optical transmitter 2 of the embodiments, and the reception apparatus corresponds to the optical receiver 3 of the embodiments. The transmission apparatus includes an insertion unit and a modulation unit. The insertion unit repeatedly inserts reference signal sequences into a transmission signal sequence at different timings. The modulation unit converts the transmission signal sequence, into which the reference signal sequences have been inserted by the insertion unit, into an optical signal, and outputs the optical signal to an optical transmission line. The reception apparatus includes a detection unit, a waveform equalization unit, and a signal quality measurement unit. The detection unit receives the optical signal which has transmitted through the optical transmission line, and converts the received optical signal into a reception signal of an electrical signal. The waveform equalization unit performs waveform equalization on the reception signal which has been converted into the electrical signal. The signal quality measurement unit extracts reception signal sequences set in sections, each of the sections corresponding to each of the reference signal sequences, from the received signal on which waveform equalization has been performed. The signal quality measurement unit calculates, for each of a plurality of combinations which include the different sections and in which the numbers of the included sections are different at least in part, a mean square error between the mean of the reception signal sequences set in the sections included in each of the combinations and the reference signal sequence. The signal quality measurement unit calculates a signal-to-noise ratio and a signal-to-distortion ratio of the reception signal using the mean square error calculated for the combinations.

The signal quality calculation unit may include an extraction unit, a waveform comparison unit, an averaging unit, and a calculation unit. The extraction unit extracts the reception signal sequences set in the sections, each of the sections corresponding to each of the reference signal sequences, from the reception signal on which waveform equalization has been performed by the waveform equalization unit. The waveform comparison unit calculates each of error signals between each of the reception signal sequences set in each of the sections and each of the reference signal sequences. For each combination of different sections, the averaging unit averages the error signals which have been calculated for the sections included in each of the combinations, and calculates a mean square error of the averaged error signals. The calculation unit calculates the signal-to-noise ratio and the signal-to-distortion ratio by using the mean square error which has been calculated for each combination of different sections and the average signal power of the reference signal sequences.

The calculation unit calculates the signal-to-noise ratio and the signal-to-distortion ratio by using a relationship in which a matrix having the reciprocal of the signal-to-noise ratio and the reciprocal of the signal-to-distortion ratio as elements is equal to a product of the reciprocal of the average signal power, a coefficient matrix based on the number of sections constituting each combination of different sections, and a matrix having the mean square error calculated for each combination of different sections as elements. For example, the above relationship corresponds to Equation (12) of the embodiment, and the coefficient matrix corresponds to the matrix A of Equation (11).

While the embodiments of the present invention have been described in detail with reference to the drawings, specific configurations are not limited to these embodiments, and include designs and the like without departing from the spirit of the present invention.

REFERENCE SIGNS LIST

1 Optical transmission system
2 Optical transmitter
3 Optical receiver
4 Optical transmission line
21 Symbol mapping unit
22 Insertion unit
23 Waveform shaping unit
24 Modulation unit
31 Detection unit
32 Waveform equalization unit
33 Demodulation unit
34 Signal quality measurement unit
41 Optical fiber
42 Optical amplifier
71 Processor
72 storage unit
73 Communication interface
74 User interface
221 Signal sequence
222 Transmission signal sequence
223 Reference signal sequence
341 Extraction unit
342 Waveform comparison unit
343-1 to 343-3 Averaging unit
344 Calculation unit

The invention claimed is:

1. An optical transmission system comprising:
a transmission apparatus including
    an inserter that repeatedly inserts reference signal sequences into a transmission signal sequence at different timings, and
    a modulator that converts the transmission signal sequence, into which the reference signal sequences have been inserted, into an optical signal; and
a reception apparatus including
    a detector that receives the optical signal which has transmitted through an optical transmission line, and converts the received optical signal into an electrical reception signal,
    a waveform equalizer that performs waveform equalization on the electrical reception signal, and
    a signal quality calculator that (i) extracts reception signal sequences set in sections, each of the sections corresponding to each of the reference signal sequences, from the electrical reception signal on which waveform equalization has been performed, (ii) calculates, for each of a plurality of combinations which include the different sections and in which the numbers of the included sections are different at least in part, a mean square error between a mean of the reception signal sequences set in the sections included in each of the combinations and the reference signal sequences, and (iii) calculates a signal-to-noise ratio and a signal-to-distortion ratio of the optical signal using the mean square error calculated for each of the combinations.

2. A signal quality measurement apparatus comprising
a signal quality calculator that (i) extracts reception signal sequences set in sections, each of the sections corresponding to each of reference signal sequences which have been repeatedly set in a signal by a transmission apparatus at different timings, from the signal obtained by converting an optical signal which has transmitted through an optical transmission line into an electrical signal, (ii) calculates, for each of the plurality of combinations which include the different sections and in which the numbers of the included sections are different at least in part, a mean square error between a mean of the reception signal sequences set in the sections included in each of the combinations and the reference signal sequences, and (iii) calculates a signal-to-noise ratio and a signal-to-distortion ratio of the optical signal using the mean square error calculated for each of the combinations.

3. The signal quality measurement apparatus according to claim 2, wherein
the signal quality calculator includes
    an extractor that extracts the reception signal sequences set in the sections, each of the sections corresponding to each of the reference signal sequences, from the electrical signal on which waveform equalization has been performed,
    a waveform comparator that calculates each of error signals between each of the reception signal sequences set in each of the sections and each of the reference signal sequences,
    an average calculator that, for each of the combinations, averages the error signals which have been calculated for the sections included in each of the combinations and calculates a mean square error of the averaged error signals, and
    a calculator that calculates the signal-to-noise ratio and the signal-to-distortion ratio using the mean square error which has been calculated for each of the combinations and average signal power of the reference signal sequences.

4. The signal quality measurement apparatus according to claim 3, wherein
the calculator calculates the signal-to-noise ratio and the signal-to-distortion ratio using a relationship in which a matrix having a reciprocal of the signal-to-noise ratio and a reciprocal of the signal-to-distortion ratio as elements is equal to a product of a reciprocal of the average signal power, a coefficient matrix based on the number of sections configuring each of the combinations, and a matrix having the mean square error calculated for each of the combinations as elements.

5. A signal quality measurement method comprising:
extracting reception signal sequences set in sections, each of the sections corresponding to each of reference signal sequences which have been repeatedly set in a signal by a transmission apparatus at different timings, from the signal obtained by converting an optical signal which has transmitted through an optical transmission line into an electrical signal; and calculating, for each of the plurality of combinations which include the different sections and in which the numbers of the included sections are different at least in part, a mean square error between a mean of the reception signal sequences set in the sections included in each of the combinations and the reference signal sequence, and calculating a signal-to-noise ratio and a signal-to-distortion ratio of the optical signal using the mean square error calculated for each of the combinations.

\* \* \* \* \*